(12) United States Patent
Wang

(10) Patent No.: US 7,636,082 B2
(45) Date of Patent: Dec. 22, 2009

(54) DIALING METHODS AND RELATED DEVICES

(75) Inventor: John C. Wang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 691 days.

(21) Appl. No.: 11/285,173

(22) Filed: Nov. 23, 2005

(65) Prior Publication Data

US 2006/0115075 A1  Jun. 1, 2006

(30) Foreign Application Priority Data

Nov. 26, 2004  (TW) .............................. 93136512 A

(51) Int. Cl.
*G06F 3/02* (2006.01)
*H04M 1/00* (2006.01)
*H04M 3/00* (2006.01)

(52) U.S. Cl. .................... 345/168; 379/353; 379/368

(58) Field of Classification Search ................ 345/168, 345/172; 455/86, 412, 556; 715/810, 864
See application file for complete search history.

(56) References Cited

U.S. PATENT DOCUMENTS 6,504,925 B1  1/2003  Schlachman et al.
7,262,761 B1 *  8/2007  Duarte et al. ............... 345/168
2002/0090081 A1  7/2002  Kitamura

FOREIGN PATENT DOCUMENTS

| CN | 1252665 A | 5/2000 |
|---|---|---|
| EP | 1 193 956 A | 4/2002 |
| GB | 2 361 839 A | 10/2001 |
| JP | 2003-087389 A | 3/2003 |
| TW | 254021 | 8/1995 |
| WO | WO-2004/049150 A | 6/2004 |

* cited by examiner

*Primary Examiner*—Sumati Lefkowitz
*Assistant Examiner*—Charles Hicks
(74) *Attorney, Agent, or Firm*—Birch, Stewart, Kolasch & Birch, LLP

(57) ABSTRACT

Dialing methods for use in a device having a keypad. The keypad comprises a plurality of dual-purpose keys and non-numerical-purpose keys. The dual-purpose key has different input definitions in a letter mode and a number mode, and the non-numerical-purpose key does not have a numerical input definition. First, at least one keystrokes are received, and an input sequence corresponding to the keystrokes is generated. If any one of the keystrokes corresponds to one of the non-numerical-purpose keys, at least one address record conforming to a letter input definition of the input sequence in the letter mode is retrieved from an address book for dialing accordingly.

9 Claims, 13 Drawing Sheets

| | | |
|---|---|---|
| Dave Davis | W: 8266234567<br>M: 0910123456 | 121 |
| Jack Dalton | W: 6161234567<br>H: 7817779999 | 122 |
| Jan Millers | W: 6171234567<br>H: 7817779997 | 123 |
| John Milton | W: 8211234567<br>H: 8267779235 | 124 |
| Ken Kennedy | W: 8510123456<br>M: 0912378456 | 125 |
| Mike Mason | W: 4151234567<br>H: 7817357369 | 126 |
| Patty Dore | W: 7131234567<br>M: 0924685785 | 127 |
| Susan Dyson | W: 7131228478<br>H: 7815379359 | 128 |
| Will Williams | W: 8211234567 | 129 |

| | |
|---|---|
| Dave Davis | W: 8266234567 |
| | M: 0910123456 |
| Mike Mason | W: 4151234567 |
| | H: 7817357369 |
| Jan Millers | W: 6171234567 |
| | H: 7817779997 |
| John Milton | W: 8211234567 |
| | H: 8267779235 |
| Ken Kennedy | W: 8510123456 |
| | M: 0912378456 |
| Will Williams | W: 8211234567 |

| | |
|---|---|
| Dave Davis | W: 8266234567 |
| | M: 0910123456 |
| Mike Mason | W: 4151234567 |
| | H: 7817357369 |
| Jan Millers | W: 6171234567 |
| | H: 7817779997 |
| John Milton | W: 8211234567 |
| | H: 8267779235 |
| Will Williams | W: 8211234567 |

140 — Dave Davis    W: 8266234567
                   M: 0910123456

Jan Millers        W: 6171234567
                   H: 7817779997

John Milton        W: 8211234567
                   H: 8267779235

140 — Dave Davis   W: 8266234567
                   M: 0910123456

Jan Millers        W: 6171234567
                   H: 7817779997

| | |
|---|---|
| Dave Davis | W: 8266234567 |
| | M: 0910123456 |
| Mike Mason | W: 4151234567 |
| | H: 7817357369 |
| Jan Millers | W: 6171234567 |
| | H: 7817779997 |
| John Milton | W: 8211234567 |
| | H: 8267779235 |
| Ken Kennedy | W: 8510123456 |
| | M: 0912378456 |
| Will Williams | W: 8211234567 |

| | |
|---|---|
| Dave Davis | W: 8266234567 |
| | M: 0910123456 |
| Mike Mason | W: 4151234567 |
| | H: 7817357369 |
| Jan Millers | W: 6171234567 |
| | H: 7817779997 |
| John Milton | W: 8211234567 |
| | H: 8267779235 |
| Will Williams | W: 8211234567 |

| | | |
|---|---|---|
| Dave Davis | W: | 8266234567 |
| | M: | 0910123456 |
| Jan Millers | W: | 6171234567 |
| | H: | 7817779997 |
| John Milton | W: | 8211234567 |
| | H: | 8267779235 |

| | | |
|---|---|---|
| Dave Davis | W: | 8266234567 |
| | M: | 0910123456 |
| Jan Millers | W: | 6171234567 |
| | H: | 7817779997 |

MILLE

| | | |
|---|---|---|
| Jan Millers | W: | 6171234567 |
| | H: | 7817779997 |

| | |
|---|---|
| Dave Davis | W: 8266234567 |
| | M: 0910123456 |
| Jack Dalton | W: 6161234567 |
| | H: 7817779999 |
| Patty Dore | W: 7131234567 |
| | M: 0924685785 |
| Susan Dyson | W: 7131228478 |
| | H: 7815379359 |

| | |
|---|---|
| Susan Dyson | W: 7131228478 |
| | H: 7815379359 |

DIALING METHODS AND RELATED DEVICES

BACKGROUND

The present disclosure relates to dialing methods, and more particularly, to dialing methods that enable dialing by name and dialing by number, and related devices.

Portable devices, such as mobile phones, PDA phones, and smart phones are convenient. More and more users carry and use the portable devices for related applications. Generally, a user can input phone numbers for dialing via a keypad. Additionally, the portable device often provides an address book function for address recording and management. A user can also input specific personal data, and retrieve corresponding address records from the address book for dialing accordingly. Further, the portable device provides an option to dial by name or dial by number. In dialing by name, the portable device can retrieve and display address records conforming to part or all of a complete name input by a user, and use the retrieved address record for dialing. In dialing by number, the portable device can retrieve and display address records confirming to part or all of a complete number input by a user, and use the retrieved address record for dialing.

The portable device is limited in size, and provides respective keys with multiple input definitions. For example, on a typical mobile phone containing a QWERTY keypad, the keypad can be used to enter letters or numbers by switching between a letter mode and a number mode. While a user has the option to either dial by name or dial by number, or requires inputting letters or numbers for retrieving address records from the address book, letter/number mode switching is an inconvenient and extra step. For example, when dialing by name, a user has to first switch the keypad to letter mode, or open the address book, which requires switching to the letter mode. After switching to the letter mode, the user is allowed to input data and dial by name.

A typical user does not desire to be forced to purposefully think ahead of time and perform the switch procedure. For example, a user may want to just dial by name when thinking about a name or dial by number when thinking about a number. The switch between the letter and number modes violates the nature of thinking and behavior model of a person, and the time and difficulty for dialing operation is therefore increased.

SUMMARY

Dialing methods and related devices are provided. In an exemplary embodiment of a dialing method for use in a device comprising a keypad, at least one keystrokes are received, and an input sequence corresponding to the keystrokes is generated. The keypad comprises a plurality of dual-purpose keys and non-numerical-purpose keys. The dual-purpose key has different input definitions in a letter mode and a number mode, and the non-numerical-purpose key does not have a numerical input definition. If any one of the keystrokes corresponds to one of the non-numerical-purpose keys, at least one address record conforming to a letter input definition of the input sequence in the letter mode is retrieved from an address book for dialing accordingly.

If all of the keystrokes correspond to the dual-purpose keys, at least one address record conforming to a letter input definition of the input sequence in the letter mode or a numerical input definition of the input sequence in the number mode is retrieved from the address book for dialing accordingly.

It is determined whether the address record conforms to the letter input definition by checking whether the letter input definition exists in the beginning or any position of at least one letter data field of the address record. It is determined whether the address record conforms to the numerical input definition by checking whether the numerical input definition exists in the beginning of at least one number data field of the address record.

The numerical input definition of the input sequence in the number mode can be used for dialing directly.

An exemplary embodiment of a device comprises a keypad, an address book and a processing unit. The keypad comprises a plurality of dual-purpose keys and non-numerical-purpose keys. The dual-purpose key has different input definitions in a letter mode and a number mode, and the non-numerical-purpose key does not have a numerical input definition. The address book comprises a plurality of address records. The processing unit receives at least one keystrokes, and generates an input sequence corresponding thereto. If any keystroke corresponds to one of the non-numerical-purpose keys, at least one address record conforming to a letter input definition of the input sequence in the letter mode is retrieved from the address book for dialing accordingly.

If all of the keystrokes correspond to the dual-purpose keys, the processing unit further retrieves at least one address record conforming to a letter input definition of the input sequence in the letter mode or a numerical input definition of the input sequence in the number mode from the address book for dialing accordingly.

The processing unit determines whether the address record conforms to the letter input definition by checking whether the letter input definition exists in the beginning or any position of at least one letter data field of the address record. The processing unit determines whether the address record conforms to the numerical input definition by checking whether the numerical input definition exists in the beginning of at least one number data field of the address record.

The processing unit further provides the use of the numerical input definition of the input sequence in the number mode for dialing directly.

Dialing methods may take the form of program code embodied in a tangible media. When the program code is loaded into and executed by a machine, the machine becomes an apparatus for practicing the disclosed method

DESCRIPTION OF THE DRAWINGS

The invention will become more fully understood by referring to the following detailed description with reference to the accompanying drawings, wherein:

FIG. 3 shows an example of an address book;

FIGS. 5A to 5F show a dialing example;

FIGS. 6A to 6E show a dialing example;

FIGS. 7A and 7B show a dialing example; and

DESCRIPTION

Dialing methods and related devices are provided.

Figure 1:
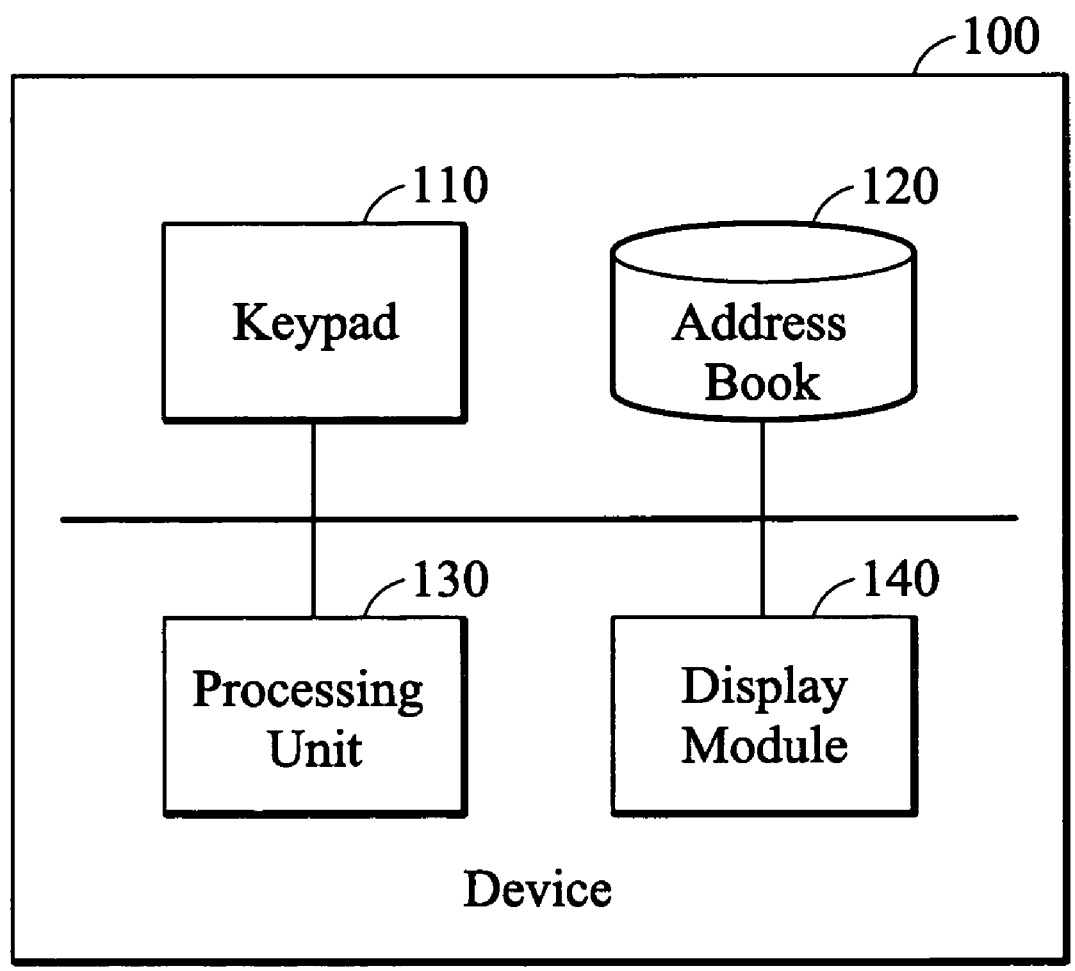
FIG. 1 is a schematic diagram illustrating an embodiment of a device performing a dialing method.

FIG. 1 is a schematic diagram illustrating an embodiment of a device performing a dialing method.

The device 100 may be a processor-based device, such as computer system, or a portable device, such as mobile phone, PDA phone, and smart phone. The device 100 comprises a keypad 110, an address book 120, a processing unit 130, and a display module 140.

Figure 2:
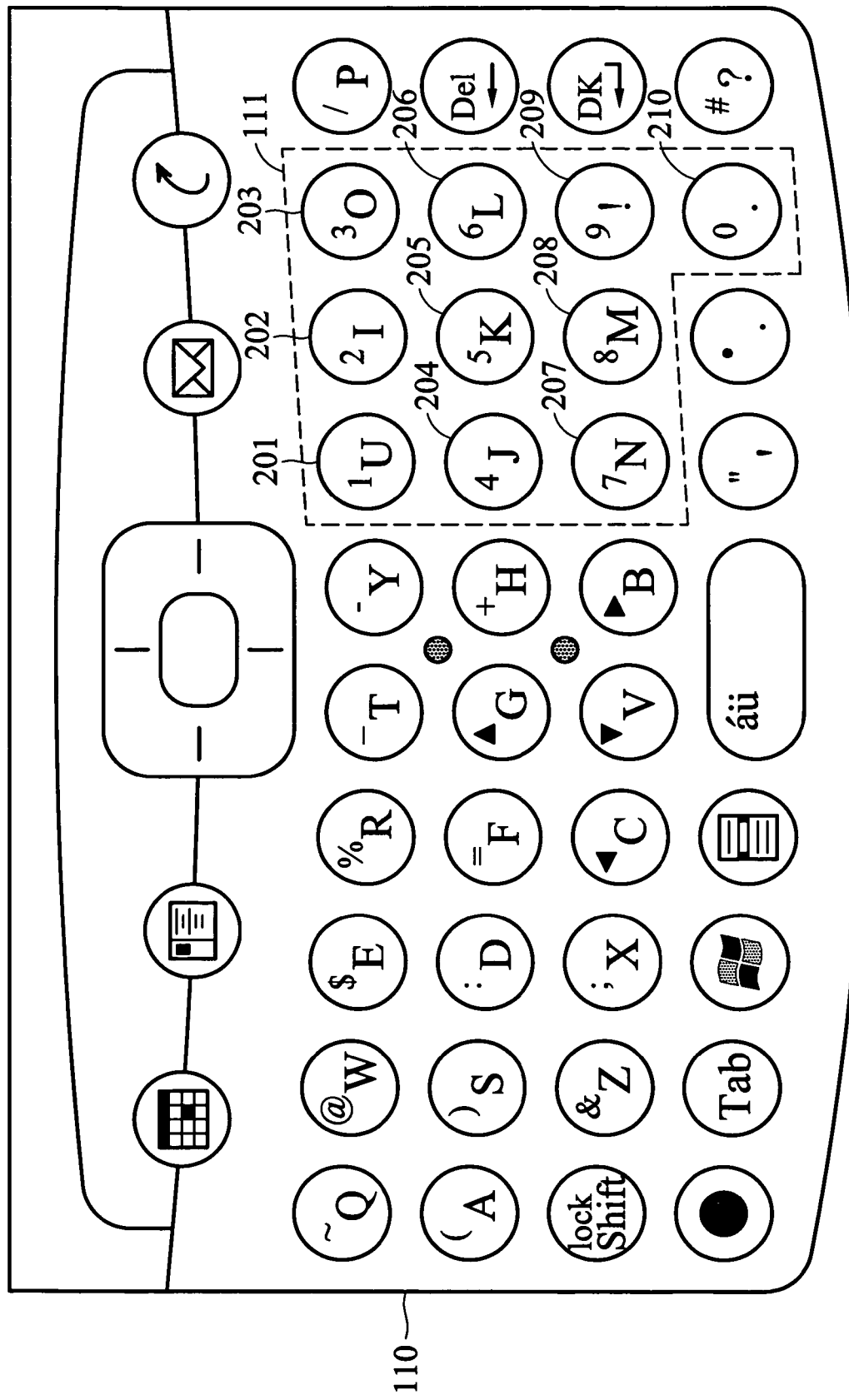
FIG. 2 shows an example of a keypad.

The keypad 110 comprises a plurality of dual-purpose keys and non-numerical-purpose keys. The dual-purpose key has different input definitions in a letter mode and a number mode, and the non-numerical-purpose key does not have a numerical input definition. FIG. 2 shows an example of a keypad, but the disclosure is not limited thereto. In this example, the keypad 110 includes several dual-purpose keys 201~210 in the block 111, and non-numerical-purpose keys outside of the block 111. For example, the input definitions of the dual-purpose key 201 in the letter mode and number mode can be "U" and "1", respectively. It is understood that, in the embodiments, the non-numerical-purpose keys are keys without input definitions in the number mode. The non-numerical-purpose keys, however, may have different input definitions in other modes. For example, the non-numerical-purpose key may have upper- and lower-case letter input definitions. The address book 120 has a plurality of address records comprising several data fields in various formats. For example, a letter data field stores first and second names of a person, a number data field stores the office, home, and mobile phone numbers of the person, and others. FIG. 3 shows an example of an address book. In this example, the address book 120 includes 9 address records 121~129. The processing unit 130 provides calculating power for device 100, and performs the dialing method. The display module 140 displays related information based on instructions from the processing unit 130.

Figure 4:
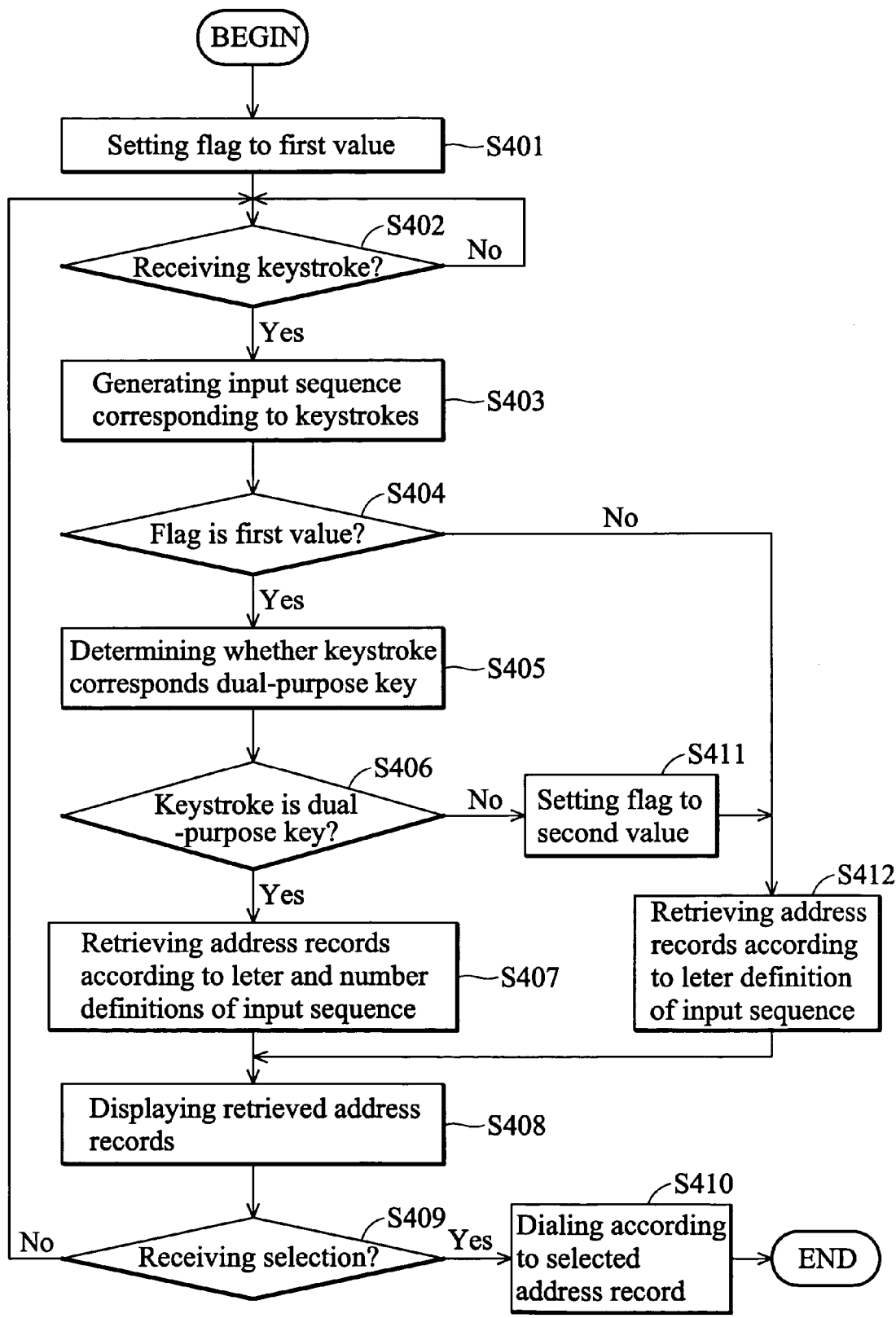
FIG. 4 is a flowchart of an embodiment of a dialing method.

FIG. 4 is a flowchart of an embodiment of a dialing method. The dialing method is used for a device comprising a keypad. The keypad comprises a plurality of dual-purpose keys and non-numerical-purpose keys. The dual-purpose key has different input definitions in a letter mode and a number mode, and the non-numerical-purpose key does not have a numerical input definition.

In step S401, the processing unit 130 sets a flag to a first value, such as false. The flag determines whether the device accepts input definitions in both letter and number modes, or only in letter mode. If the flag is the first value, the device accepts input definitions in both letter and number modes. If the flag is a second value, such as true, the device accepts input definitions in letter mode.

In step S402, the processing unit 130 determines whether a keystroke is received. If not, the procedure remains at step S402. If so, in step S403, the processing unit 130 generates an input sequence corresponding to the keystroke. It is understood that the respective keystrokes are combined to generate and store an input sequence according to the corresponding input order before an input procedure completes. In step S404, the processing unit 130 determines whether the flag is the first value. If not, the procedure goes to step S412. If so, in step S405, it is determined whether the keystroke is one of the dual-purpose keys. If so (Yes in step S406), in step S407, the processing unit 130 retrieves address records conforming to a letter input definition of the input sequence in the letter mode and a numerical input definition of the input sequence in the number mode from the address book 120, and in step S408, displays the retrieved address records via the display module 140. If the keystroke is not a dual-purpose key, that is the keystroke corresponds to one of the non-numerical-purpose keys (No in step S406), in step S411, the processing unit 130 sets the flag to the second value, and in step S412 retrieves address records conforming to a letter input definition of the input sequence in the letter mode from the address book 120, and in step S408, displays the retrieved address records via the display module 140.

It is understood that the processing unit 130 determines whether an address record conforms to the letter input definition by checking whether the letter input definition exists in the beginning or any position of at least one letter data field of the address record. The processing unit 130 determines whether an address record conforms to the numerical input definition by checking whether the numerical input definition exists in the beginning of at least one number data field of the address record. Additionally, the processing unit 130 also displays the numerical input definition of the input sequence in the number mode via the display module 140. The user can select an address record displayed in the display module 140 via the keypad 110 for dialing accordingly. Further, the user can directly press a confirmation key or a dialing key to dial according to the numerical input definition of the input sequence in the number mode. If no selection is received by the processing unit 130 (No in step S409), the procedure returns to step S402 to await another keystroke. If a selection is received by the processing unit 130 (Yes in step S409), in step S410, a call is placed according to the phone number of the selected address record.

Figure 5E:
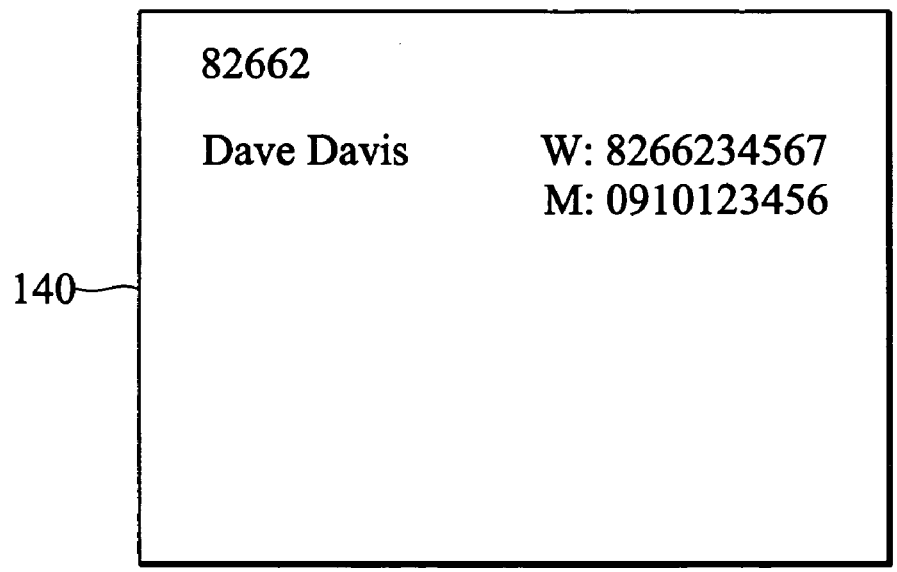

In FIGS. 2, 3 and 5A-5F, a dialing example is shown. When key [8/M] 208 is pressed, the display module 140 displays the numerical input definition "8" of [8/M] 208 in the number mode, and the address records retrieved from the address book 120 as shown in FIG. 5A. Since key [8/M] 208 is a dual-purpose key, the retrieved address records conform to the letter input definition "M" of [8/M] 208 in the letter mode and the numerical input definition "8" of [8/M] 208 in the number mode. It is noted that, in this example, the matched letter or numerical input definition is from the beginning of the data field. The user inputs keys [2/I] 202, [6/L] 206, and [6/L] 206 in order, as respectively shown in FIGS. 5B~5D.

Figure 5F:
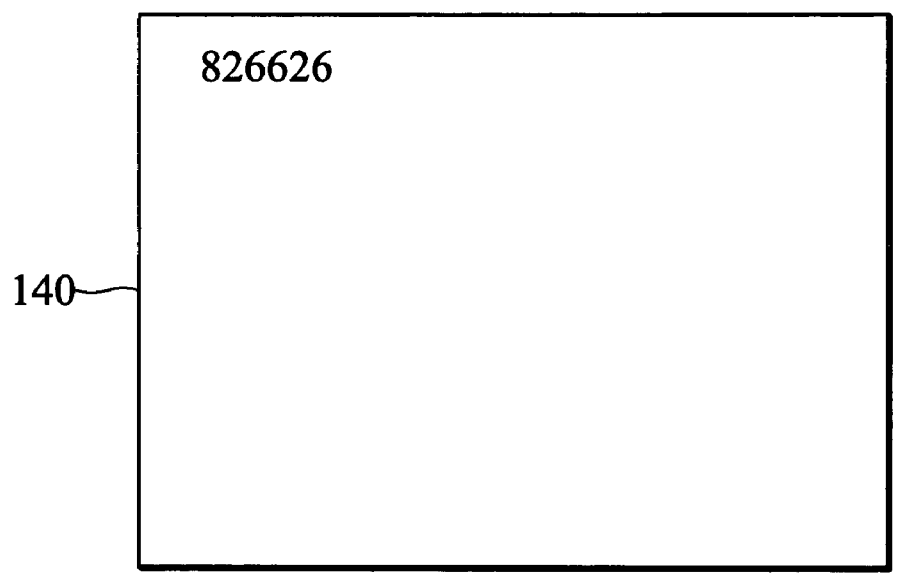

The user presses key [2/I] 202. As shown in FIG. 5E, the address book 120 includes only an address record conforming to the numerical input definition, and no address record conforming to the letter input definition. Since, at this time, the user may be searching the address book by number, or dialing an entirely new number. It is understood that the user can select any of the retrieved address records for dialing in the procedure from FIGS. 5A to 5E. When key [6/L] 206 is further pressed, and no matched address record is in the address book 120, as shown in FIG. 5F, the user wants to dial with an entirely new number. After the complete number is input, the user can press confirmation key or dialing key for dialing.

In FIGS. 2, 3 and 6A-6E, a dialing example is shown. The user inputs keys [8/M] 208, [2/I] 202, [6/L] 206, and [6/L] 206 in order, as respectively shown in FIGS. 6A~6D. If the user continues to input key [E] of the keypad 110, since key [E] is a non-numerical-purpose key, the processing unit 130 enables the device 100 to accept only the input definition in the letter mode. At this time, the retrieved address record conforms to the letter input definition "MILLE" of [8/M] 208, [2/I] 202, [6/L] 206, [6/L] 206, and [E], as shown in FIG. 6E.

In FIGS. 2, 3, 7A, and 7B, a dialing example is shown. Key [D] of the keypad 110 is pressed. Since key [D] is a non-numerical-purpose key, the processing unit 130 enables the device 100 to accept only the input definition in the letter mode, and retrieve address records according to the letter input definition "D" of key [D] in the letter mode, as shown in FIG. 7A. Key [Y] of the keypad 110 is further pressed. The processing unit 130 then retrieves address records according to the letter input definition "DY" of keys [D] and [Y] in the letter mode, as shown in FIG. 7B.

Figure 8:
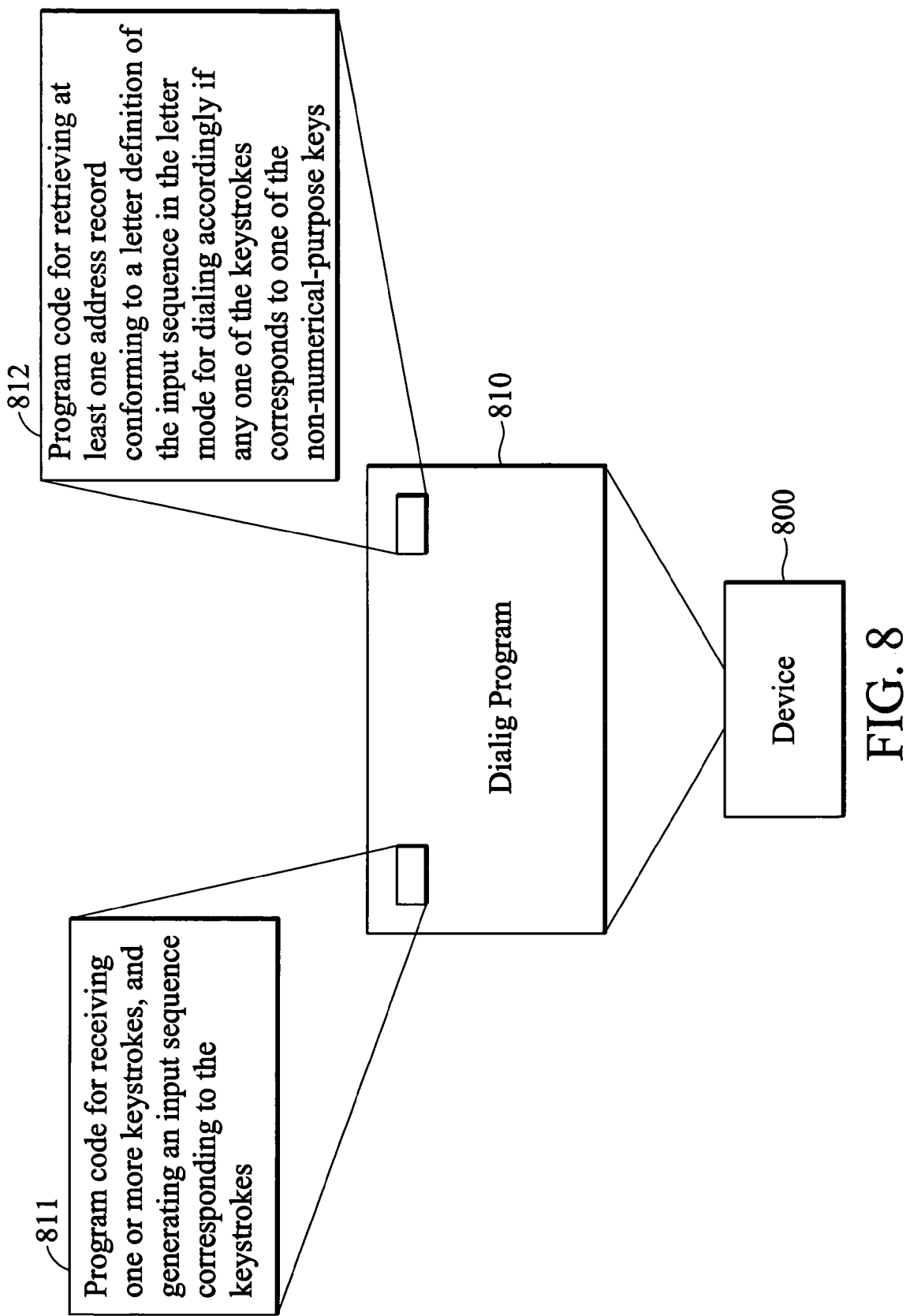
FIG. 8 is a schematic diagram illustrating an embodiment of a storage medium storing a computer program for execution of a dialing method.

FIG. 8 is a schematic diagram illustrating an embodiment of a storage medium storing a computer program for execution of a dialing method. The computer program product comprises a storage medium 810 storing computer readable program code for use in a device 800, such as computer system and mobile device. The device 800 comprises a keypad comprising a plurality of dual-purpose keys and non-numerical-purpose keys. The dual-purpose key has different input definitions in a letter mode and a number mode, and the non-numerical-purpose key does not have a numerical input definition. The computer readable program code comprises at least computer readable program code 811 receiving at least one keystrokes, and generating an input sequence corresponding to the keystrokes, and computer readable program code 812 retrieving at least one address record conforming to a letter input definition of the input sequence in the letter mode for dialing accordingly if any of the keystrokes corresponds to one of the non-numerical-purpose keys.

Dialing methods, or certain aspects or portions thereof, may take the form of program code (i.e., executable instructions) embodied in tangible media, such as products, floppy diskettes, CD-ROMS, hard drives, or any other machine-readable storage medium, wherein, when the program code is loaded into and executed by a machine, such as a computer or a device comprising a mobile phone, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine, such as a computer or a device comprising a mobile phone, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A dialing method used in a device comprising a keypad, the keypad comprising a plurality of dual-purpose keys and non-numerical-purpose keys, the dual-purpose key having different input definitions in a letter mode and a number mode, and the non-numerical-purpose key without numerical input definition, comprising:

receiving at least one keystrokes, and generating an input sequence corresponding thereto;

if any keystroke corresponds to one of the non-numerical-purpose keys, retrieving a first address record conforming to a letter input definition of the input sequence in the letter mode from an address book for dialing accordingly, in which the first address record comprises at least one letter data field, and the letter input definition matches the beginning of the letter data field of the first address record; and retrieving a second address record conforming to the letter input definition of the input sequence in the letter mode from an address book for dialing accordingly, in which the second address record comprises at least one letter data field, and the letter input definition matches any position of content from the second character to the last character of the letter data field of the second address record; and if the keystrokes correspond to the dual-purpose keys, retrieving a third address record conforming to the letter input definition of the input sequence in the letter mode from the address book for dialing accordingly;

retrieving a fourth address record conforming to a numerical input definition of the input sequence in the number mode from the address book for dialing accordingly, in which the fourth address record comprises at least one number data field, and the numerical input definition matches the beginning of the number data field of the fourth address record; and excluding a fifth address record, in which the fifth address record comprises at least one letter data field, and at least one number data field, and the numerical input definition matches the letter data field, but not the number data field of the fifth address record.

2. The method of claim 1, further comprising dialing using the numerical input definition of the input sequence in the number mode.

3. The method of claim 1, further comprising receiving a selection of the retrieved address record, and dialing according to at least one phone number corresponding to the selected address record.

4. The method of claim 1, further comprising displaying the retrieved address record.

5. A device, comprising:

a keypad comprising a plurality of dual-purpose keys and non-numerical-purpose keys, the dual-purpose key having different input definitions in a letter mode and a number mode, and the non-numerical-purpose key without numerical input definition;

an address book comprising a plurality of address records; and a processing unit receiving at least one keystrokes, generating an input sequence corresponding thereto, if any keystroke corresponds to one of the non-numerical-purpose keys, retrieving a first address record conforming to a letter input definition of the input sequence in the letter mode from an address book for dialing accordingly, in which the first address record comprises at least one letter data field, and the letter input definition matches the beginning of the letter data field of the first address record, and retrieving a second address record conforming to the letter input definition of the input sequence in the letter mode from an address book for dialing accordingly, in which the second address record comprises at least one letter data field, and the letter input definition matches any position of content from the second character to the last character of the letter data field of the second address record, and if the keystrokes correspond to the dual-purpose keys, retrieving a third address record conforming to the letter input definition of the input sequence in the letter mode from the address book for dialing accordingly, retrieving a fourth address record conforming to a numerical input definition of the input sequence in the number mode from the address book for dialing accordingly, in which the fourth address record comprises at least one number data field, and the numerical input definition matches the beginning of the number data field of the fourth address record, and excluding a fifth address record, in which the fifth address record comprises at least one letter data field, and at least one number data field, and the numerical input definition matches the letter data field, but not the number data field of the fifth address record.

6. The device of claim 5, wherein the processing unit further dials using the numerical input definition of the input sequence in the number mode.

7. The device of claim 5, wherein the processing unit further receives a selection of the retrieved address record, and dials according to at least one phone number corresponding to the selected address record.

8. The device of claim 5, further comprising a display module displaying the retrieved address record.

9. A machine-readable storage medium comprising a computer program, which, when executed, causes a device to perform a dialing method, the device comprising a keypad comprising a plurality of dual-purpose keys and non-numerical-purpose keys, the dual-purpose key having different input definitions in a letter mode and a number mode, and the non-numerical-purpose key without numerical input definition, the method comprising:

receiving at least one keystrokes, and generating an input sequence corresponding thereto;

if any keystroke corresponds to one of the non-numerical-purpose keys, retrieving a first address record conforming to a letter input definition of the input sequence in the letter mode from an address book for dialing accordingly, in which the first address record comprises at least one letter data field, and the letter input definition matches the beginning of the letter data field of the first address record; and retrieving a second address record conforming to the letter input definition of the input sequence in the letter mode from an address book for dialing accordingly, in which the second address record comprises at least one letter data field, and the letter input definition matches any position of content from the second character to the last character of the letter data field of the second address record; and if the keystrokes correspond to the dual-purpose keys, retrieving a third address record conforming to the letter input definition of the input sequence in the letter mode from the address book for dialing accordingly;

retrieving a fourth address record conforming to a numerical input definition of the input sequence in the number mode from the address book for dialing accordingly, in which the fourth address record comprises at least one number data field, and the numerical input definition matches the beginning of the number data field of the fourth address record; and excluding a fifth address record, in which the fifth address record comprises at least one letter data field, and at least one number data field, and the numerical input definition matches the letter data field, but not the number data field of the fifth address record.

\* \* \* \* \*

UNITED STATES PATENT AND TRADEMARK OFFICE
CERTIFICATE OF CORRECTION

PATENT NO. : 7,636,082 B2 Page 1 of 1
APPLICATION NO. : 11/285173
DATED : December 22, 2009
INVENTOR(S) : John C. Wang It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 942 days.

Signed and Sealed this

Twenty-first Day of December, 2010

David J. Kappos
*Director of the United States Patent and Trademark Office*